United States Patent [19]

Ronen

[11] Patent Number: 5,028,178

[45] Date of Patent: Jul. 2, 1991

[54] SPRING COLLETS

[76] Inventor: Mordechai Ronen, Maskit St., Industrial Zone, Hertzlia, Israel

[21] Appl. No.: 465,573

[22] Filed: Jan. 18, 1990

Related U.S. Application Data

[63] Continuation-in-part of Ser. No. 177,100, Apr. 4, 1988, abandoned.

[30] Foreign Application Priority Data

Feb. 19, 1988 [IL] Israel ........................................ 85515

[51] Int. Cl.[5] ................................................ B23B 31/20

[52] U.S. Cl. ........................................ 409/136; 408/59; 279/20; 279/1 Q; 279/1 ME; 279/52

[58] Field of Search ................... 279/46, 46 A, 1 ME, 279/1 Q, 47-53, 20; 409/135, 136; 408/57, 59

[56] References Cited

U.S. PATENT DOCUMENTS

| | | | |
|---|---|---|---|
| 2,012,826 | 8/1935 | Montgomery | 279/1 ME |
| 2,277,816 | 3/1942 | Brown | 279/1 ME |
| 2,557,301 | 6/1951 | Lundy | 279/46 |
| 2,608,414 | 8/1952 | Montgomery | 279/51 |
| 3,889,962 | 6/1975 | Parsons | 279/46 |

*Primary Examiner*—Gary F. Paumen
*Assistant Examiner*—Robert Schultz
*Attorney, Agent, or Firm*—Fleit, Jacobson, Cohn, Price, Holman & Stern

[57] ABSTRACT

A chuck having a spring collet is disclosed. The spring collet has a plurality of pairs of adjacent collet segments with interstices formed between each of the collet segments. The interstices of the collet each having radially extending cutout seats with resilient stoppers received therein which extend between a tool received in the collet and the body of the chuck to prevent coolant from leaking therebetween when flowing through the collet by way of a duct in the tool. The stoppers of the collet are axially spaced from each other so as not to weaken the collet.

4 Claims, 2 Drawing Sheets

SPRING COLLETS

This application is a continuation-in-part of application Ser. No. 07/177,100, filed Apr. 4, 1988, now abandoned.

FIELD AND BACKGROUND OF THE INVENTION

It is well known that the operative working tools of machine tools, such as drills of drilling machinery or cutting tools of lathes, shaping-and milling machines require constant cooling when working on metal workpieces. Generally the cooling is effected by feeding a coolant, such as an acqueous soap solution or oil to the tool. Many arrangements for feeding the coolant to the working tool have been proposed, some more and some less effective, but none being fully satisfactory, in view of certain technical difficulties inherent to the respective metal working processes. Especially, in the case of working tools held in spring collet chucks (such as generally employed for precision work) the cooling of the tool presented some difficulty.

KNOWN ART

It has been suggested to provide the respective tool with a through-going bore or more than one such bore and to direct the liquid coolant through the chuck and the collect to the hind end of the respective tool, i.e. to the inlet port of the said bore or bores, such that the coolant is made to flow through the tool and leave at the working end of the respective tool. Such an arrangement is illustrated schematically by FIGS. 1 and 1*a* of the annexed drawings.

Here is shown a collet chuck generally indicated by the numeral 1 in the collet portion of which is held a cutting tool 4. As in conventional, the tool 4 is secured by a nut 3 screwing on jaws 6.

Throughout the length of tool 4 extend two bores 4'. Into the chuck 1 leads —at its rear end —a central opening 7 into the hollow interior of the chuck. The bores 4' of tool 4 communicate with the said hollow space within the chuck.

Experience has shown that even with such an arrangement the cooling effect remains far from being satisfactory, since only a small part of the coolant flows into and through bores 4', while the greater part ineffectively escapes, flowing along The outside of tool 4 and leaves at the front end of collet 2. This is illustrated by the FIG. 1, the coolant C flowing to a small part into bores 4' and mainly into the open at the annular gap A around the tool 4.

SHORT SUMMARY OF DISCLOSURE

According to the invention —and in order to overcome the disadvantages described above —in a simple, but yet effective way small, preferably elastic stoppers are placed in the space surrounding a tool held in a spring collet, such stoppers extend radially from the outer lateral surface of the respective tool.

Preferably the stoppers are positioned at different distances from the ends of the tool.

The spring collet of the present invention for holding a working tool in a machining operation wherein the working tool has a throughbore therein of the passage of a coolant therethrough, includes a body member. The body member has an upper end portion, a lower end portion, an outer surface and an inner surface defined by a central bore extending along the central axis of the body member from one end portion to the other. The body member also includes a plurality of vicinal segments extending from the upper end portion along the central bore to the lower end portion along the central bore. Each of the vicinal segments is at least partially separated by an interstice extending radially relative to the central bore of the body member from the upper end portion to the lower end portion. At least one stopper is provided in each interstice separating the integral segments, with the stoppers extending perpendicular to the central bore and extending from the outer surface of the body member to the inner surface of the body member. The stoppers are provided at least at two different distances from the end portion of the body member so as not to weaken the body member a that level. Thus, when a coolant enters the body member from the upper end portion, it may flow about at least a portion of the vicinal segments and along the working tool positioned in the central bore, with the stoppers preventing the flow of the coolant through the lower end portion of the body member from the vicinal segments.

In the disclosed embodiment, at least two semi-circular incisions are provided in each vicinal segment, with each semi-circular incision being opposed to one of the semi-circular incisions formed in an adjacent vicinal segment. In this way, circular seats are formed between the vicinal segments for the stoppers. In addition, the outer surface of the body member is inclined downwardly from the upper end portion to the lower end portion of the body member relative to the central bore. Further, at least some of said interstices extend along the lower end portion of said body member from said outer surface to said inner surface.

SHORT DESCRIPTION OF DRAWINGS

The invention will be described now with reference to FIGS. 2, 2*a* and 2*b* of the attached drawings.

FIG. 2 being an axial section of a tool held in a collet chuck,

FIG. 2*a* illustrating the collet (without whatever tool held therein),

FIG. 2*b* being a diametrical, sectional view of a collet with coolant retaining stoppers in place therein.

DESCRIPTION OF PREFERRED EMBODIMENT

Figure 1:
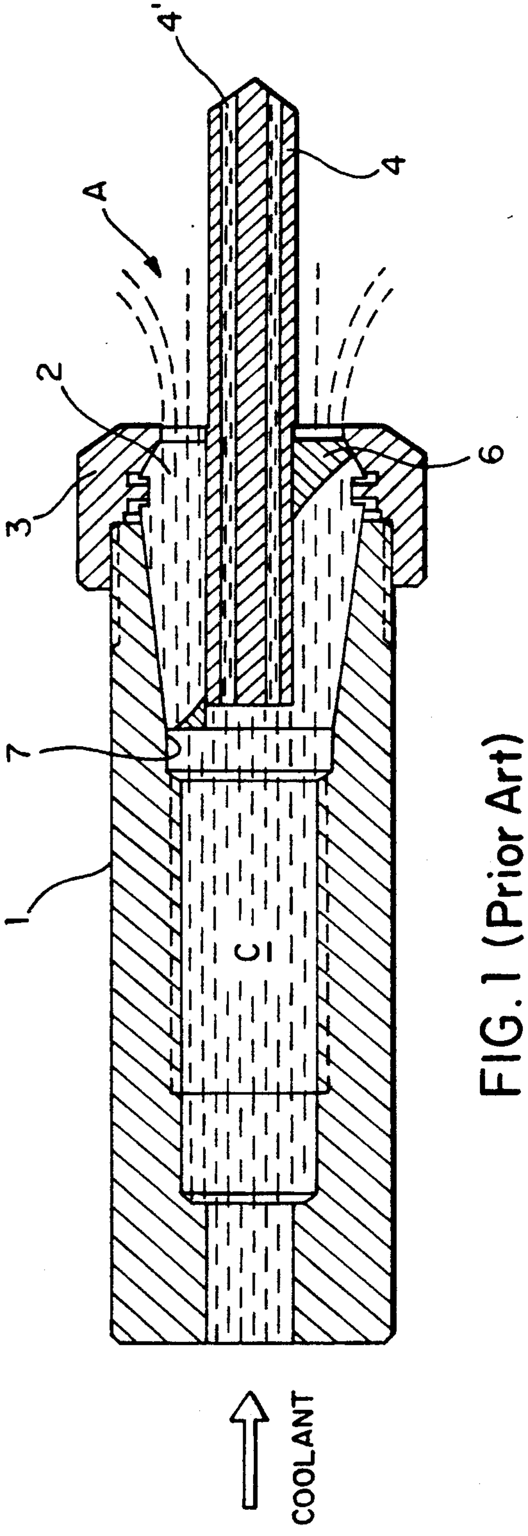
Figure 1A:
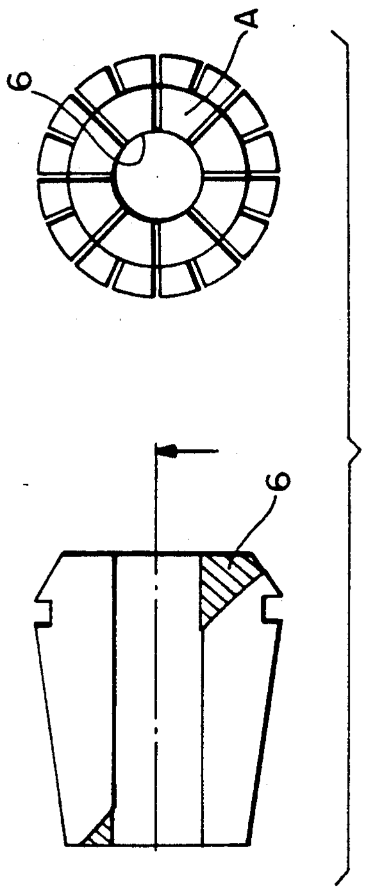

The chuck, generally indicated by numeral 10 is of conventional design, its rear end at 10' being in communication with a source of coolant which enters the internal cavity of chuck 10 at that end. As is customary, in the forward end of the chuck 10 is provided a spring collet 20 comprising a number of segments 20'. On the chuck 10 —securing the collet —screws a nut 20. In the chuck is held a tool 40 (in the case shown a drill) which has two longitudinally extending, throughgoing bores 40'. Through the interstices between individual segments 20' extend radially —relative to tool 40 cylindrical, resilient stoppers 50. As can be seen in FIG. 2*a*, these stoppers are set at different distances from the ends of collet 20 to prevent weakining of the collet structure. Advantageously, and in order to securely hold the stoppers 50 small, semi-circular incisions are made in the edges of the segments 20', the two incisions in the edges of two vicinal segments 20' complementing to form a circular seat for a stopper 50.

The incisions are set at different distances from the end of collet 20 so as not to weaken the collet at that level. Furthermore, due to the fact that in most such collets the direction of the slots alter from side to side alternatively the consequence is that the stoppers are at different distances from one of the ends of the collet.

Figure 2:
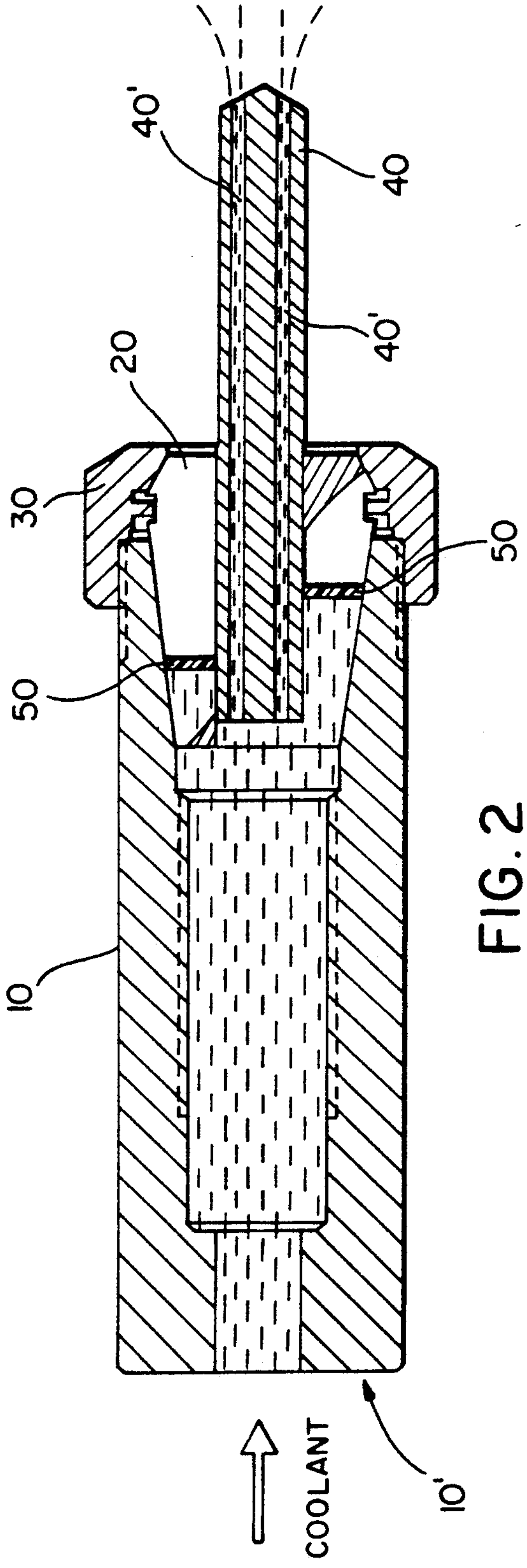
Figure 2B:
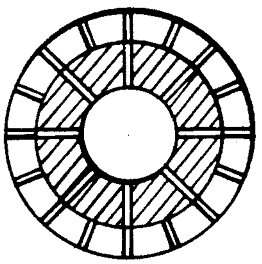
Figure 2A:
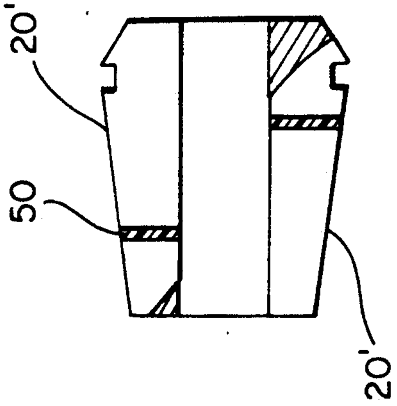

The coolant is indicated in FIG. 2 by broken lines, showing that the flow of coolant stops at the radially positioned stoppers, forcing the flow into bores 40' exclusively. There is no coolant emission, as experience has shown, at the frontal end of the chuck.

I claim:

1. In combination, a device for holding a working tool in a machining operation, and working tool held by the device the working tool having a first throughbore therein for passage of coolant therethrough, said device comprising longitudinally extending collet chuck means defining a longitudinal axis, and axially extending second throughbore in the collet chuck means having a rear end for admission of coolant and a forward end for holding spring collet segments, a plurality of spring collet segments slidably received in the forward end of said collet chuck means throughbore spaced about the longitudinal axis thereof, said spring collet segments being slidable longitudinally in said forward end of said collect chuck means throughbore for constricting said segments and said segments holding the tool fast therein with the rear end of said second throughbore communicating with the first throughbore, tightening means coacting with said segments and said collet chuck means for sliding said segments in the collet chuck means throughbore to constrict said segments for holding the tool fast in the collet chuck means throughbore whereby coolant introduced into the collet chuck means throughbore will also pass through the tool throughbore, the segments defining pairs of adjacent segments, each pair of adjacent segments mutually defining a cylindrical cutout forming a radially extending seal seat extending from an outer surface of the tool to an inner surface of the collet chuck means throughbore and a resilient cylindrical stopper seated in each circular cutout seal seat and extending from the outer surface of the tool to the inner surface of the collet chuck means throughbore for sealing off the collet chuck means throughbore between the adjacent pairs of segments and forcing coolant to flow through the tool throughbore, said cylindrical cutout seal seats and resilient cylindrical stoppers seated therein being spaced apart along the longitudinal axis of the collet chuck means.

2. A combination as claimed in claim 1 wherein said stopper means are of elastic material.

3. A combination as claimed in claim 1 wherein each said cylindrical cutout seal seat is formed by opposed semi-circular cutouts in said pair of adjacent segments.

4. A device for holding a working tool in a machining operation, the working tool having a throughbore therein for passage of coolant therethrough, said device comprising a collet chuck defining a longitudinal axis, and axially extending throughbore in the chuck having a rear end for admission of coolant and a forward outwardly tapered end for holding spring collet segments, a plurality of tapered spring collet segments slidably received in the forward end of the collet chuck throughbore spaced about the longitudinal axis thereof, said spring collet segments being slidable longitudinally in said forward end of said collet chuck throughbore for constricting said segments for holding a tool fast therein, tightening means on a forward end portion of said collet chuck and coacting with said segments for sliding said segments in the collet chuck throughbore, the segments defining pairs of adjacent segments, each pair of adjacent segments mutually defining a cut-out forming a radially extending seal seat extending from respective outer surfaces to respective inner surfaces of the segments, and a resilient cylindrical stopper seated in each seal seat and extending from the respective outer surfaces to the inner surfaces of the segmens for sealing off the collet chuck throughbore between the adjacent pairs of segments, said seal seats and resilient stoppers being respectively spaced apart along the longitudinal axis of the collet chuck, said seal seats and resilient stoppers being located rearwardly of the tightening means with respect to the forward end of the collet chuck throughbore and said resilient stoppers having respectively different radial dimensions conforming to radial thicknesses of the respective tapered segments at respective locations of the stoppers lengthwise of the segments.

* * * * *